D. MORIARTY.
TIRE CASING.
APPLICATION FILED MAR. 14, 1922.
1,422,290.
Patented July 11, 1922.
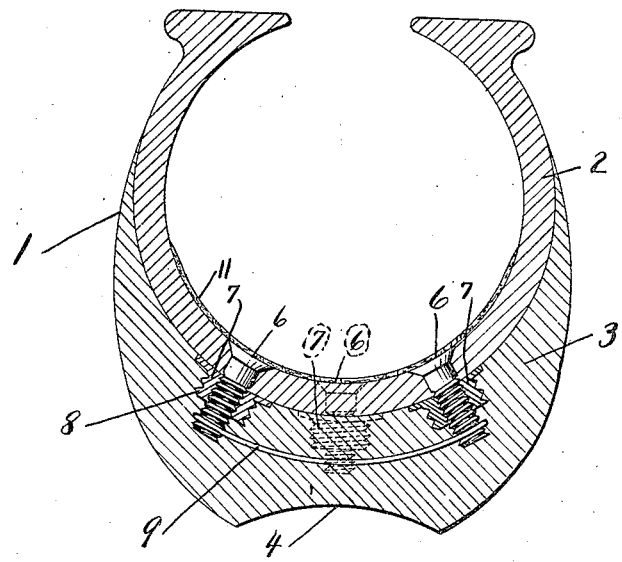
Fig. I
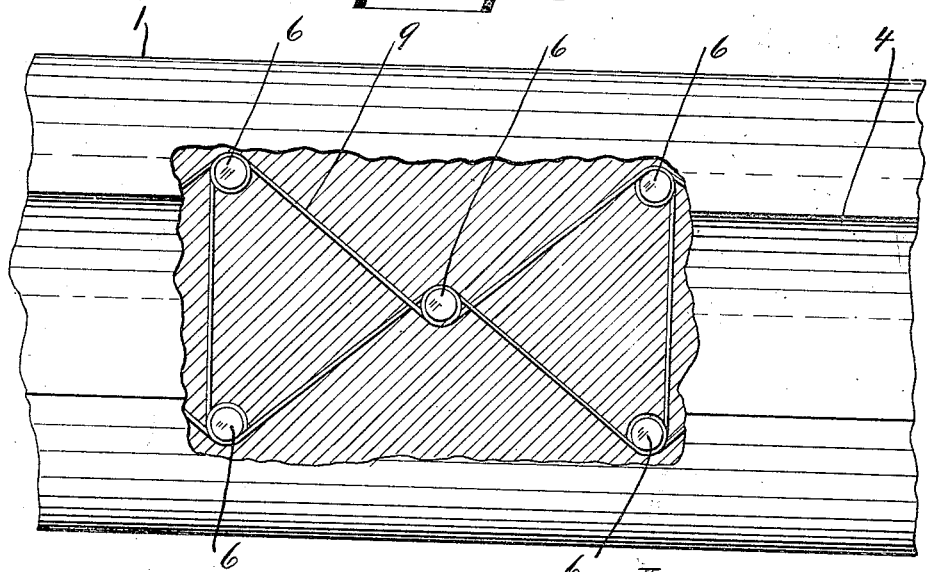
Fig. II
INVENTOR
DANIEL MORIARTY
By
ATTORNEYS

UNITED STATES PATENT OFFICE.

DANIEL MORIARTY, OF OAKLAND, CALIFORNIA.

TIRE CASING.

1,422,290.  Specification of Letters Patent.  Patented July 11, 1922.

Application filed March 14, 1922. Serial No. 543,701.

*To all whom it may concern:*

Be it known that I, DANIEL MORIARTY, a citizen of the United States, and resident of Oakland, county of Alameda, and State of California, have invented a new and useful Tire Casing, of which the following is a specification.

The present invention relates to improvements in tire casings and has particular reference to pneumatic tires commonly used for motor vehicles. The specific object of the present invention is to provide a tread member for the tire preferably made of rubber which will be especially adapted to withstand high pressure and has splendid wearing qualities, rendering the tire practically immune from punctures. A further object of the invention is to provide means for firmly securing the tread member to an inner fabric member.

With these objects in mind, I have shown the preferred form of my invention in the accompanying drawing in which Figure 1 represents a cross-section through my tire and Figure 2 an end view of a portion of the same looking at it from the outside, a central portion being broken away so as to disclose the inner construction. While I have shown only the preferred form of my invention I wish to have it understood that various changes or modifications may be made within the scope of the claims hereto attached without departing from the spirit of the invention.

My tire (1) is principally composed of two members, one inner member (2) which may be made of any suitable material preferably of fabric such as is commonly used for this purpose and a tread member (3) surrounding the outer circumference of the inner member (2). The tread member is preferably made of vulcanized rubber and is made heaviest along its outer circumference, its thickness being slightly reduced where it comes in contact with the road surface by an arced recess (4) allowing of engagement with the road over a larger surface.

The principal part of my invention is the means for securing the rubber tread member to the fabric. I provide a plurality of screws (6) which are secured in the fabric and firmly locked in their position by means of nuts (7) on the outside of the fabric, while the threaded end of each nut extends into the tread member which latter also covers the nuts (7) the outside of which is preferably threaded as shown at (8) for the purpose of giving the rubber a firmer hold on its surface. I preferably provide three parallel rows of these screws, one central row and two side rows, the screws belonging to the latter rows extending into the rubber either in radial direction as shown in the drawing or forced into an almost perpendicular position. In the drawing the screws of each outer row are shown as being disposed in staggered relation to the screws of the center row and this is the preferable manner of arranging them, although I do not wish to be confined to this arrangement.

To prevent the screws from working loose and to maintain them in the same position relative to each other I provide a flexible connecting means between the screws preferably by a wire (9) passed around neighboring screws preferably in zig-zag line so as to include the center row as shown in Figure 1. This wire combines all the individual screws into one firm structure and being embedded in the rubber with the screws it combines the rubber tread and the fabric into one solid unit very much in the same manner as reinforcing wires bind concrete into an inseparable and lasting unit.

To prevent heat to be transmitted from the screws to the inner tube, I provide an asbestos layer (11) between the same and the tire.

I claim:

1. A tire casing comprising an inner member of fabric material, a rubber tread for the same, rigid members secured in the fabric extending into the rubber, and reinforcing wires between the rigid members within the rubber.

2. A tire casing comprising an inner member of fabric material, a rubber tread for the same, a plurality of screws secured in the fabric treadedly engaging the rubber and reinforcing wires between the screws within the rubber.

3. A tire casing comprising an inner member of fabric material, a rubber tread for the same, a plurality of screws extending through the fabric into the rubber having nuts thereon adjacent the fabric for firmly holding the screws to the latter.

4. A tire casing comprising an inner member of fabric material, a rubber tread for the same, a plurality of screws extending through the fabric into the rubber having nuts thereon adjacent the fabric for firmly holding the screws to the latter and reinforcing wires between the rubber.

5. A tire casing comprising an inner member of fabric material, a rubber tread for the same, a plurality of screws extending through the fabric into the rubber having nuts thereon adjacent the fabric for firmly holding the screws to the latter, reinforcing wires between the screws within the rubber and a layer of asbestos inside the casing for preventing heat to spread from the screws to the inner tube.

DANIEL MORIARTY.